(12) United States Patent
Kellner

(10) Patent No.: US 10,384,721 B2
(45) Date of Patent: Aug. 20, 2019

(54) BODY COMPONENT

(71) Applicant: Dr. Ing. h.c. F. Porsche Aktiengesellschaft, Stuttgart (DE)

(72) Inventor: Philipp Kellner, Renningen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 38 days.

(21) Appl. No.: 15/715,256

(22) Filed: Sep. 26, 2017

(65) Prior Publication Data

US 2018/0093710 A1    Apr. 5, 2018

(30) Foreign Application Priority Data

Oct. 5, 2016    (DE) ........................ 10 2016 118 891

(51) Int. Cl.
| | | |
|---|---|---|
| *B60J 7/00* | (2006.01) | |
| *B62D 21/15* | (2006.01) | |
| *B62D 25/04* | (2006.01) | |
| *B62D 25/20* | (2006.01) | |
| *B62D 29/00* | (2006.01) | |
| *B62D 29/04* | (2006.01) | |
| *B62D 25/02* | (2006.01) | |

(52) U.S. Cl.
CPC ........... *B62D 21/152* (2013.01); *B62D 25/04* (2013.01); *B62D 25/20* (2013.01); *B62D 29/002* (2013.01); *B62D 29/005* (2013.01); *B62D 29/007* (2013.01); *B62D 29/008* (2013.01); *B62D 29/04* (2013.01); *B62D 25/025* (2013.01)

(58) Field of Classification Search
CPC ......... B32B 2605/18; B32B 5/18; B32B 3/28; B32B 2266/0214; B64C 1/12; C04B 41/009; C04B 24/26; C04B 35/486; C07C 31/202; C07C 29/09
USPC ...................................................... 296/187.1
See application file for complete search history.

(56) References Cited

U.S. PATENT DOCUMENTS

| | | | | |
|---|---|---|---|---|
| 9,302,710 B2 * | 4/2016 | Bach | ..................... | B62D 25/06 |
| 9,365,242 B1 * | 6/2016 | Yang | ..................... | B62D 25/04 |
| 9,457,844 B2 * | 10/2016 | Yoshida | ................ | B62D 25/04 |
| 9,487,239 B2 * | 11/2016 | Schnug | .................. | B62D 25/04 |
| 9,517,800 B2 * | 12/2016 | Komamura | .......... | B62D 21/152 |
| 9,580,111 B1 * | 2/2017 | Caliskan | .............. | B62D 29/043 |
| 9,604,674 B2 * | 3/2017 | Fujii | .................... | B62D 25/087 |
| 9,616,936 B2 * | 4/2017 | Nakamura | ............ | B62D 25/06 |
| 9,623,730 B2 * | 4/2017 | Mori | ..................... | B62D 25/04 |
| 9,623,910 B2 * | 4/2017 | Kiyoshita | ............ | B62D 25/025 |

(Continued)

*Primary Examiner* — Kiran B Patel
(74) *Attorney, Agent, or Firm* — Leydig, Voit & Mayer, Ltd.

(57) ABSTRACT

A body component for a motor vehicle provides at least one inner shell manufactured from an aluminum material and at least one outer shell manufactured from an aluminum material, the at least one inner shell and the at least one outer shell being connected to one another at least at flange regions and providing at least one cavity between them; and at least one reinforcement element arranged in the cavity. The inner shell is connected only by a rear section to the reinforcement element, such that the rear section of the inner shell is reinforced in dimensionally stable fashion by the reinforcement element in order to safeguard the passenger compartment, and is delimited by a front, non-reinforced section for energy dissipation.

16 Claims, 1 Drawing Sheet

(56) References Cited

U.S. PATENT DOCUMENTS

| | | | | |
|---|---|---|---|---|
| 9,630,652 B2* | 4/2017 | Balur | B62D 25/025 |
| 9,637,173 B2* | 5/2017 | Nishimura | B62D 25/02 |
| 9,643,655 B2* | 5/2017 | Saito | B62D 25/04 |
| 9,701,345 B2* | 7/2017 | Kanemori | B62D 21/152 |
| 9,738,319 B2* | 8/2017 | Hasegawa | B62D 25/025 |
| 9,751,389 B2* | 9/2017 | Rompage | B60J 10/40 |
| 9,758,193 B2* | 9/2017 | Boettcher | B62D 25/025 |
| 9,764,766 B2* | 9/2017 | Yoshida | B62D 21/157 |
| 9,764,769 B2* | 9/2017 | Boettcher | B62D 25/04 |
| 9,764,774 B2* | 9/2017 | Tomizawa | B62D 25/14 |
| 9,776,666 B2* | 10/2017 | Yamada | B62D 21/157 |
| 9,776,670 B2* | 10/2017 | Park | B62D 25/14 |
| 9,802,651 B2* | 10/2017 | Miranda | B62D 25/04 |
| 9,878,743 B2* | 1/2018 | Maruyama | B62D 21/02 |
| 9,884,650 B2* | 2/2018 | Blum | B62D 25/025 |
| 9,884,652 B2* | 2/2018 | Elfwing | B62D 21/157 |
| 9,889,888 B2* | 2/2018 | Narahara | B62D 25/025 |
| 9,896,133 B2* | 2/2018 | Elfwing | B62D 25/025 |
| 9,902,432 B2* | 2/2018 | Yoshida | B62D 21/02 |
| 9,908,562 B2* | 3/2018 | Mukainakano | B62D 25/04 |
| 9,981,695 B2* | 5/2018 | Sunohara | B62D 25/2036 |
| 10,035,543 B2* | 7/2018 | Sato | B60J 5/0444 |
| 10,035,544 B2* | 7/2018 | Lee | B62D 21/157 |
| 10,059,376 B2* | 8/2018 | Heitkamp | B62D 29/008 |
| 10,099,725 B2* | 10/2018 | Ishii | B62D 25/025 |
| 2017/0050675 A1* | 2/2017 | Kellner | B62D 25/025 |

* cited by examiner

BODY COMPONENT

CROSS REFERENCE TO RELATED APPLICATIONS

This application claims benefit to German Patent Application No. DE 10 2016 118 891.3, filed Oct. 5, 2016, which is hereby incorporated by reference herein.

FIELD

The present invention relates to a body component, in particular a pillar and/or a sill, for a motor vehicle.

BACKGROUND

Certain test procedures for vehicle safety, and for example the Small Overlap crash load situation of the Insurance Institute for Highway Safety (IIHS), lead to very high loads in the region of the lower A pillar and of the sill. Owing to the small overlap of only 25%, the rigid, bollard-like barrier that is used here in some cases does not strike the front longitudinal member. In this way, it is scarcely possible for energy in the vehicle front end to be dissipated. It is rather the case that, in certain situations, the barrier pushes the front wheel with brake disk against the A pillar.

In the prior art, to safeguard the survival area for the passengers while allowing for the abovementioned crash load situation, substantially two basic approaches are known.

Firstly, it is possible for solid reinforcement measures to be implemented on the sill and on the A pillar and on the bulkhead. For this purpose, use is normally made of ultra-high-strength, hot-worked steel. This however gives rise to a considerable additional weight and high additional costs.

In a second approach, the lower A pillar and/or the front end of the sill are designed to be deformable in regions. In this way, energy dissipation is possible there. Certain other regions of the A pillar and/or of the sill are, by contrast, of ultra-high-strength and/or dimensionally stable design. This is intended to make it possible to reliably safeguard the survival space for the occupants. A disadvantage of this approach is however that a targeted combination of ultra-high-strength, hot-worked steel, on the one hand, and soft, ductile steel, on the other hand, must be used for this purpose. Therefore, in the case of this approach, the use of lightweight materials and, for example, aluminum, is ruled out. This is however particularly unfavorable in the case of weight-optimized vehicles and for example sports cars, in the case of which the pillars and sills are manufactured from aluminum materials. In the case of such vehicles, it is therefore necessary, in order to satisfy the desired safety requirements, in particular in the context of the crash load situation mentioned above, for the affected components to be converted from aluminum to steel. This gives rise to considerable additional weight. Furthermore, this entails very great outlay in terms of construction and economic expenditure.

SUMMARY

In an embodiment, the present invention provides a body component for a motor vehicle. The pillar provides at least one inner shell manufactured from an aluminum material and at least one outer shell manufactured from an aluminum material, the at least one inner shell and the at least one outer shell being connected to one another at least at flange regions and providing at least one cavity between them; and at least one reinforcement element arranged in the cavity. The inner shell is connected only by a rear section to the reinforcement element, such that the rear section of the inner shell is reinforced in dimensionally stable fashion by the reinforcement element in order to safeguard the passenger compartment, and is delimited by a front, non-reinforced section for energy dissipation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
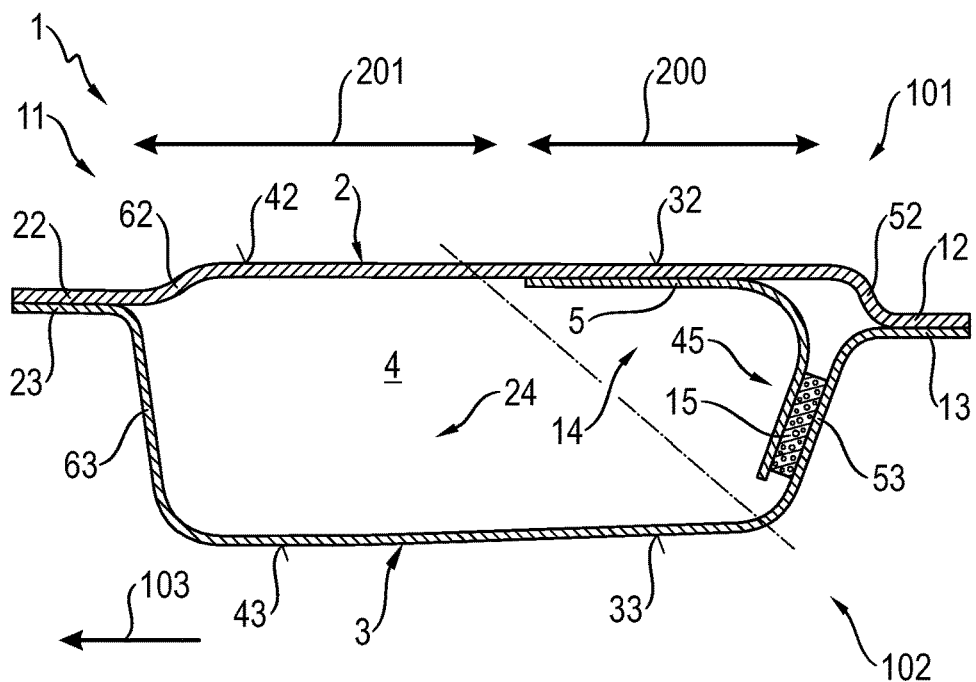
FIG. 1 shows a highly schematic illustration of a body component according to the invention in a horizontally sectioned view.

An aspect of the present invention provides a body component for a motor vehicle which offers improved safety in the event of a crash, and in particular in an IIHS Small Overlap crash load situation, and which furthermore permits a considerable weight reduction. It is sought here in particular to be able to produce the body component from aluminum materials.

Body components according to embodiments of the invention are formed in particular as a pillar and/or as a sill. Body components according to embodiments of the invention are provided for a motor vehicle and comprise at least one inner shell and at least one outer shell. The inner shell and the outer shell are connected to one another at least at their flange regions and provide at least one cavity between them. At least one reinforcement element is arranged in the cavity. The inner shell and the outer shell are manufactured from at least one lightweight material, and in particular from an aluminum material. Here, the inner shell is connected only by means of its rear section to the reinforcement element, such that, by means of the reinforcement element, the rear section of the inner shell is reinforced in dimensionally stable fashion in order to safeguard the passenger compartment and is delimited by a front, non-reinforced section for energy dissipation.

Body components according to embodiments of the invention offer numerous advantages. The connection of the inner shell to the reinforcement element, in the case of which the inner shell is connected only by way of the rear section to the reinforcement element, offers a considerable advantage.

In this way, the body component offers a high level of safety for the passengers in the event of crash, and in particular in an IIHS Small Overlap crash load situation, and can furthermore be manufactured from aluminum material. A highly advantageous weight reduction is achieved in this way. Through the use of the body component according to embodiments of the invention, in the case of vehicles with aluminum bodies, a conversion to steel materials is not necessary.

In the context of the present invention, the designations "rear" and "front" can relate in particular to an operational installed position of the body component in a motor vehicle in relation to the intended forward direction of travel.

The rear section of the inner shell is situated, for example, in a rear half or a rear third of the inner shell. The rear section of the inner shell may also be arranged in the rear three quarters of the inner shell.

The front, non-reinforced section, which is provided for energy dissipation, of the inner shell is preferably formed without a connection to the reinforcement element. The front section of the inner shell is preferably intentionally designed to be deformable.

It is particularly preferable for the inner shell and the outer shell to each comprise a front flange region and a rear flange region. In particular, a main surface extends between the front and the rear flange region of a shell. In particular, a front frame is arranged at a transition from the main surface to the front flange region, and/or a rear frame is arranged at a transition from the main surface to the rear flange region. The main surface closer to the rear flange region provides, in particular, a rear main surface. The main surface closer to the front flange region provides, in particular, a front main surface.

The reinforcement element is particularly preferably arranged only in a rear part of the cavity, such that, by means of the reinforcement element, in the rear part of the cavity, a dimensionally stable safety region is delimited with respect to a front deformation region for energy dissipation. Such positioning of the reinforcement element makes it possible for the demanded safety aspects to be satisfied in a particularly reliable manner. It is particularly preferable for the cavity to be equipped, in the region of a lower A pillar and/or of a front sill, with a reinforcement element arranged in this way.

The reinforcement element is preferably fastened to a rear main surface and/or to a rear frame of the inner shell. In particular, the reinforcement element is not fastened to a flange region. At these positions, the reinforcement element has a particularly advantageous effect with regard to crash safety.

In all embodiments, it is preferred that the reinforcement element extends beyond a structural space spanned by the inner shell into a structural space spanned by the outer shell. In this way, a particularly dimensionally stable safety region can be built up in the rear part of the cavity. The reinforcement element extends in particular from the rear main surface of the inner shell via the rear flange regions of inner shell and outer shell to a rear main surface and/or rear frame of the outer shell.

The reinforcement element is in particular of curved and/or angled form. For example, the reinforcement element has a U-shaped or V-shaped contour in its cross section. In particular, a curvature and/or edge of the reinforcement element points rearward. The curvature and/or edge preferably points in the direction of the rear flange regions and/or of the rear frames of inner shell and outer shell.

In all refinements, it is furthermore preferred that the reinforcement element is connected to the outer shell. In particular, the reinforcement element is connected to a rear main surface and/or to a rear frame of the outer shell. By means of such a connection of the reinforcement element to the outer shell, the occupant protection is further improved, and a particularly dimensionally stable safety region is formed. In particular, the reinforcement element is connected to the outer shell by means of that part which projects beyond the structural space of the inner shell.

The reinforcement element is preferably connected to the outer shell by means of at least one adhesive connection. In particular, the reinforcement element is connected to the outer shell by means of a structural foam which expands and adhesively bonds in a cathodic dip coating drying process. This permits an economical and uncomplicated fastening of the reinforcement element to the outer shell. Other cohesive connecting means are also possible. It is also possible for positively locking connecting means to be provided.

In an advantageous refinement, the reinforcement element may have at least one corner stiffening piece and/or at least one bead. The corner stiffening piece and/or the bead are in particular suitable and designed for counteracting a deformation and/or a movement of the reinforcement element caused by the expansion of a structural foam in a cathodic dip coating drying process.

The reinforcement element is preferably formed from an aluminum material and/or a steel material and/or from a fiber-reinforced plastic. In particular, the reinforcement element is designed as a reinforcement panel. Here, the reinforcement panel may comprise at least one aluminum panel and/or at least one steel panel and/or at least one organic sheet panel. Such a reinforcement element affords a high level of safety and can furthermore be used economically.

In a particularly advantageous refinement, the reinforcement element has a greater strength than the inner shell and/or the outer shell. A greater strength of the reinforcement element than the inner shell or outer shell permits a particularly reliable division of the pillar cross section into the safety region and the deformation region. The reinforcement element is composed in particular of a material with a greater strength than the material of the inner shell and/or of the outer shell. For example, the reinforcement element is formed as a panel part with a greater strength than the corresponding panel parts of the inner shell and/or outer shell.

The reinforcement element is preferably composed of a high-strength 6000 series or 2000 series and particularly preferably a 7000 series aluminum alloy. In particular, the reinforcement element is provided by at least one panel part composed of an alloy of said type. Other aluminum alloys or other materials are also possible.

It is possible for at least one cover panel to be arranged on an outer side of the outer shell. The cover panel preferably, in an operational installed position of the body component in a motor vehicle, forms an at least partially visible outer surface of a lower A pillar. In particular, the cover panel is at least partially visible when a door is open. The cover panel is for example formed as an aluminum panel.

It is also possible for at least one partition panel to be arranged between the inner shell and the outer shell. It is also possible for at least one local supporting panel to be fastened to the inner shell and/or to the outer shell. Such partition panels or local supporting panels permit an advantageous structural incorporation of the body component into the overall body. The partition panel and/or the supporting panel extend in particular outside the front and/or rear cavity.

In a particularly advantageous refinement, the body component is formed as at least one section of a lower A pillar and/or of a front sill. The body component may also comprise at least one section of a lower A pillar and/or of a front sill. The body component may also be formed as at least one section of another pillar and/or of at least one other sill of a motor vehicle. Since said body regions are subjected to particularly high loads in certain crash situations, such a body component can be used particularly advantageously for improving the crash safety.

The inner shell and/or the outer shell are formed in particular as panel parts. The inner shell and/or the outer shell are preferably provided by, or comprise, at least one aluminum panel part or at least one panel part composed of an aluminum alloy.

The inner shell and the outer shell, in particular the panel parts are preferably each substantially of U-shaped or hat-shaped design. Here, the U shape or hat shape may have targeted adaptations in the bulge region and/or at the limbs. For example, flange regions may be provided on the limbs.

Embodiments of the present invention additionally provide motor vehicles that include at least one body component as described above.

FIG. 1 shows a body component 1 according to an embodiment of the invention, which in this case is formed as an A pillar 11 of a passenger motor vehicle. Here, the A pillar is shown in a horizontally sectioned illustration in the lower pillar region. The A pillar 11 which is shown is provided for a left-hand vehicle side as viewed from above. For illustrative purposes, the forward direction of travel 103 of the motor vehicle is depicted by an arrow.

The body component 1 comprises an inner shell 2 and an outer shell 3, which in this case are each formed as a panel part composed of an aluminum alloy. In the arrangement shown here of the body component 1 on a left-hand vehicle side, the inner shell 2 is directed toward the passenger compartment 101, and the outer shell 3 is directed toward the driver's door 102.

Here, the inner shell 2 comprises a rear flange region 12 and a front flange region 22. Between the flange regions 12, 22, the inner shell 2 has a main surface 32, 42. At a transition from the front flange region 22 to a front main surface 42, the inner shell 2 in this case has a front frame 62. Correspondingly, a rear frame 52 is also formed between a rear main surface 32 and the rear flange region 12.

Here, the outer shell 3 is likewise formed with a front flange region 23, a front frame 63, a front main surface 43, a rear main surface 33 and a rear frame 53 and a rear flange region 13.

The flange regions 12, 22 of the inner shell 2 are connected to the corresponding flange regions 13, 23 of the outer shell 3. In this way, the inner shell 2 and the outer shell 3 form a common member cross section. A cavity 4 is provided between the shells 2, 3. The frames 53, 63 of the outer shell 3 are taller than the frames 52, 62 of the inner shell 2.

A reinforcement element 5, which in this case is in the form of a reinforcement panel, is arranged, so as to be protected against corrosion, in the cavity 4. The reinforcement element 5 is arranged only in a rear part 14 of the cavity 4. By means of such a local arrangement of the reinforcement element 5 in the cavity 4, a dimensionally stable safety region 14 is provided by the rear part 14. Furthermore, in this way, a non-reinforced deformation region 24 for targeted energy dissipation is provided in the front part of the cavity 4. Here, the reinforcement element 5 does not extend into the front deformation region 24.

Here, the inner shell 2 is connected only by means of its rear section 200 to the reinforcement element 5. The rear section 200 is for example the rear main surface 32, or is arranged between the rear frame 52 and the front main surface 42. In this section 200, the reinforcement element 5 is preferably fixedly joined to the inner shell 2, for example by adhesive bonding and/or by mechanical joining and/or by welding. The reinforcement element 5 may also be joined in positively locking fashion to the rear section 200 of the inner shell 2.

By means of the targeted connection of the reinforcement element 5 to the rear section 200 of the inner shell 2, the rear section 200 is reinforced in dimensionally stable fashion in order to safeguard the passenger compartment 101. Furthermore, the rear section 200 is delimited with respect to a front, non-reinforced section 201, which is provided for targeted energy dissipation in the event of a crash. For illustrative purposes, the rear section 200 and the front section 201 are in this case very coarsely schematically indicated by arrows.

Here, the reinforcement element 5 projects beyond the structural space spanned by the inner shell 2 into a structural space spanned by the outer shell 3. Here, the reinforcement element 5 is fastened by means of the section 45, which projects into the structural space of the outer shell 3, to a rear frame 53 of the outer shell 3.

The fastening is realized for example by means of an adhesive connection 15. The adhesive connection 15 is made possible in this case by means of a structural foam 15 which, during a cathodic dip coating drying process, expands and connects the components 3, 5 to one another.

Here, the reinforcement element 5 is of curved form, wherein the curvature points in the direction of the rear part 14 of the cavity 4.

Figure 2:
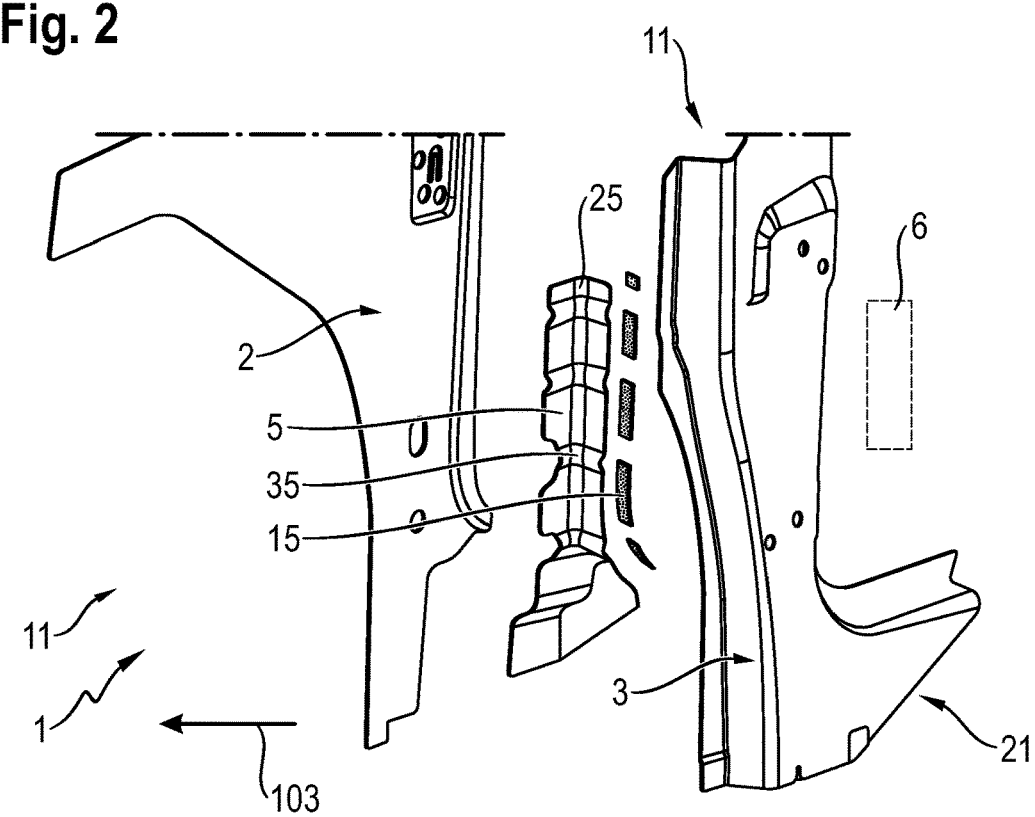
FIG. 2 shows a body component in an exploded illustration.

FIG. 2 shows a body part 1 which provides a lower A pillar and a front sill section 21. For this purpose, the components are shown in an exploded illustration.

To produce the pillar 11 or the sill 21, the inner shell 2 and the outer shell 3 are joined together, and are for example welded. The cavity 14 is formed as a result of the joining-together of the shells 2, 3.

In the cavity 4, the reinforcement element 5 is arranged in a rear part 14. The structural foam 15 provided for the fastening of the reinforcement element 5 to the outer shell 3 can be clearly seen here.

Here, on the outer side of the outer shell 3, there is situated a further panel component which is formed as a cover panel 6. The cover panel 6 provides a visible outer surface of the lower A pillar 11, in particular when a door is open.

Here, the reinforcement element 5 has corner stiffening pieces 25 and beads 35. Here, the corner stiffening piece 25 or the beads 35 prevent that section 45 of the reinforcement element 5 which projects beyond the structural space spanned by the inner panel from being pushed away by the expansion of the structural foam 15.

In the event of a crash, and for example in the Small Overlap crash situation test, the rear, in section 200, 14 reinforced by the reinforcement element 5 is scarcely deformed, such that the survival space for the occupants is safeguarded.

The front, outer region 201, 24 of the lower A pillar 11 or of the front sill 21 has no reinforcement element 5, and is, by contrast, intensely deformed in such a crash. In this way, energy can be dissipated in targeted fashion, and a slide-off plane for the front wheel can be provided by deformation.

Here, it is particularly advantageous that this positive crash behavior can be implemented even in the case of an A pillar 11 or a sill 21 which is manufactured from an aluminum material and for example from aluminum panels. The body component 1 thus offers a particularly great weight reduction in relation to pillars and sills composed of steel materials and for example a combination of ultra-high-strength, hot-worked steel and soft, ductile steel.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERAL LIST

1 Body component
2 Inner shell
3 Outer shell
4 Cavity
5 Reinforcement element
6 Cover panel
11 Pillar
12 Flange region
13 Flange region
14 Part, safety region
15 Adhesive connection, structural foam
21 Sill
22 Flange region
23 Flange region
24 Deformation region
25 Corner stiffening piece
32 Main surface
33 Main surface
35 Bead
42 Main surface
43 Main surface
45 Section
52 Frame
53 Frame
62 Frame
63 Frame
101 Passenger compartment
102 Driver's door
103 Direction of travel
200 Section
201 Section

What is claimed is:

1. A body component for a motor vehicle, comprising:
at least one inner shell manufactured from an aluminum material and at least one outer shell manufactured from an aluminum material, the at least one inner shell and the at least one outer shell being connected to one another at least at flange regions and providing at least one cavity between them; and
at least one reinforcement element arranged in the cavity, wherein the inner shell is connected only by a rear section to the reinforcement element, such that the rear section of the inner shell is reinforced in dimensionally stable fashion by the reinforcement element in order to safeguard the passenger compartment, and is delimited by a front, non-reinforced section for energy dissipation.

2. The body component as claimed in claim 1, wherein the reinforcement element is arranged only in a rear part of the cavity, such that, by way of the reinforcement element, in the rear part of the cavity, a dimensionally stable safety region is delimited with respect to a front deformation region for energy dissipation.

3. The body component as claimed in claim 1, wherein the reinforcement element is fastened to a rear main surface and/or to a rear frame of the inner shell.

4. The body component as claimed in claim 1, wherein the reinforcement element extends beyond a structural space spanned by the inner shell into a structural space spanned by the outer shell.

5. The body component as claimed in claim 1, wherein the reinforcement element is connected to a rear main surface and/or to a rear frame of the outer shell.

6. The body component as claimed in claim 1, wherein the reinforcement element is connected to the outer shell by a structural foam which expands and adhesively bonds in a cathodic dip coating drying process.

7. The body component as claimed in claim 1, wherein the reinforcement element has at least one corner stiffening piece and/or at least one bead which is configured to counteract a deformation and/or movement of the reinforcement element caused by an expansion of a structural foam in a cathodic dip coating drying process.

8. The body component as claimed in claim 1, wherein the reinforcement element is formed from an aluminum material and/or a steel material and/or from a fiber-reinforced plastic.

9. The body component as claimed in claim 1, wherein the reinforcement element has a greater strength than the inner shell and/or the outer shell.

10. The body component as claimed in claim 1, wherein, on an outer side of the outer shell, there is arranged at least one cover panel which, in an operational installed position of the body component in a motor vehicle, forms an at least partially visible outer surface of a lower A pillar.

11. The body component as claimed in claim 1, wherein at least one partition panel is arranged between the inner shell and the outer shell, and/or wherein at least one local supporting panel is fastened to the inner shell and/or to the outer shell.

12. The body component as claimed in claim 1, formed as at least one section of a pillar and/or of a sill.

13. The body component as claimed in claim 12, wherein the pillar is a lower A pillar.

14. The body component as claimed in claim 12, wherein the sill is a front sill.

15. The body component as claimed in claim 1, wherein the rear section of the inner shell is a rear third, a rear half, or a rear three-quarters of the inner shell between the flange regions.

16. The body component as claimed in claim 15, wherein the font, non-reinforced section of the inner shell is not connected to the reinforcement element.

* * * * *